United States Patent [19]

Kleber

[11] 4,408,740

[45] Oct. 11, 1983

[54] APPARATUS FOR ACCELERATION-FREE MOUNTING OF A BODY IN A SPACECRAFT

[75] Inventor: Peter Kleber, Bergisch-Gladbach, Fed. Rep. of Germany

[73] Assignee: Deutsche Forschungs- und Versuchsanstalt fur Luft, Fed. Rep. of Germany

[21] Appl. No.: 274,456

[22] Filed: Jun. 17, 1981

[30] Foreign Application Priority Data

Jun. 27, 1980 [DE] Fed. Rep. of Germany ....... 3024127

[51] Int. Cl.³ ............................................. B64G 1/22
[52] U.S. Cl. ............................ 244/158 R; 244/164; 29/148.4 R; 269/73; 248/589; 248/638; 248/661; 156/DIG. 62
[58] Field of Search ................. 244/158 R, 164, 165, 244/167, 171; 74/3.2, 5.2, 5.6 A, 5.6 E, 5.4; 89/40 B, 41 CE; 29/148.4, DIG. 17; 156/DIG. 62; 250/201, 203 R, 215; 164/61, 65; 269/73, 71; 422/245, 250; 248/589, 638, 661; 354/74; 73/505, 510; 318/580

[56] References Cited

U.S. PATENT DOCUMENTS

| | | | |
|---|---|---|---|
| 2,431,706 | 12/1947 | Nisbet et al. | 73/505 |
| 3,281,094 | 10/1966 | Jasperson | 244/3.2 |
| 3,362,073 | 1/1968 | Hausenblas et al. | 89/41 CE |
| 3,379,889 | 4/1968 | Barnett et al. | 250/215 |
| 3,421,715 | 1/1969 | Cohlan | 244/166 |
| 3,534,926 | 10/1970 | Wuenscher | 156/DIG. 62 |
| 3,703,999 | 11/1972 | Forys | 354/70 |
| 3,785,595 | 1/1974 | Fischell | 244/166 |
| 4,328,713 | 5/1982 | Lund | 248/661 |

Primary Examiner—Galen L. Barefoot
Attorney, Agent, or Firm—Diller, Ramik & Wight

[57] ABSTRACT

To ensure that a body will be independent of gravitation for the performance of tests, an evacuable protection box is provided which encloses contactfree the body from all sides.

The protection box has contactless scanning units to monitor the position of the body in its inside. It is conducted along three axes by a guiding system firmly connected to the spacecraft.

The movements along each of the three axes is accomplished by driving means controlled by the scanning units so that the protection box follows changed positions of the body relative to the spacecraft.

9 Claims, 1 Drawing Figure

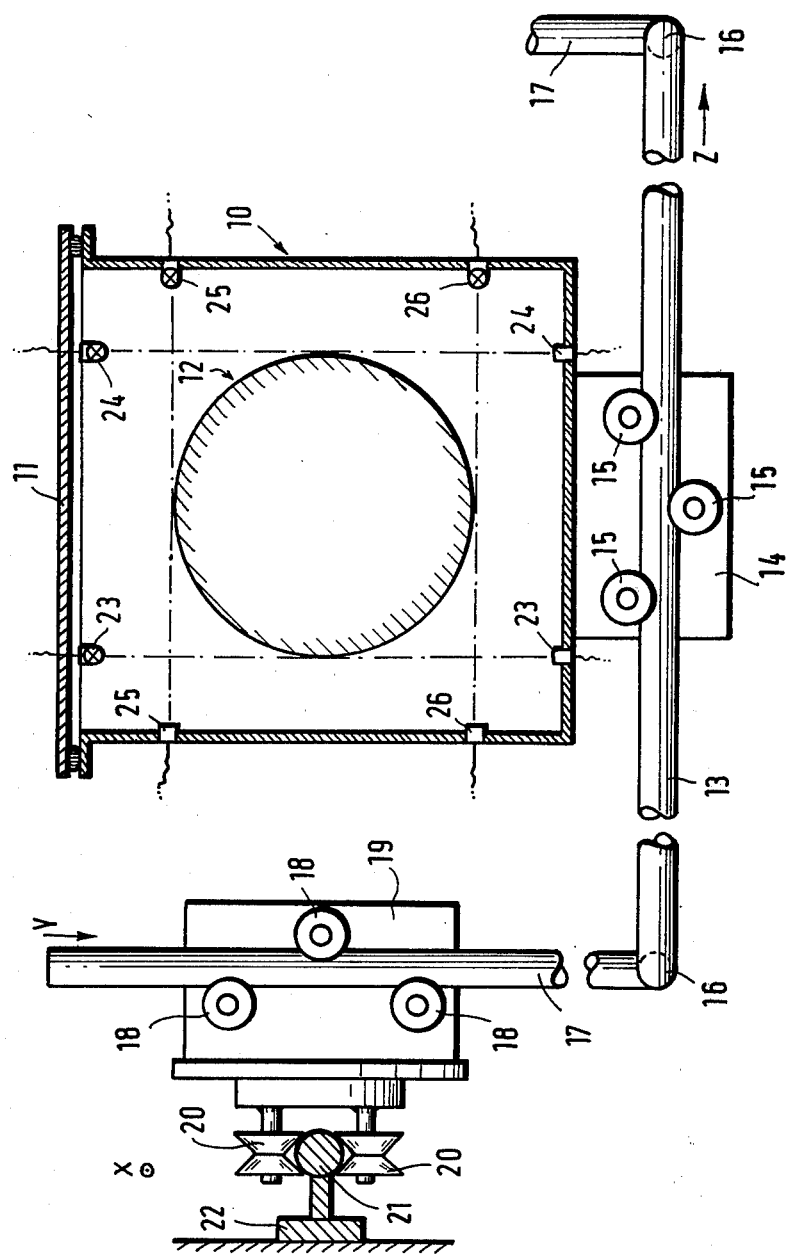

APPARATUS FOR ACCELERATION-FREE MOUNTING OF A BODY IN A SPACECRAFT

The invention relates to an apparatus for mounting acceleration-free a body in a spacecraft.

As known, by means of space flights, it is possible to make researches in a nearly zero-gravity condition. Complete zero-gravity or freedom of acceleration, however, does not exist even inside a spacecraft where, due to the gas atmosphere and the mutual influence exercised by the various masses, there is always a residual accelaration of $10^{-4}$ to $10^{-6}$ g (g=acceleration due to gravity). In many cases of the fundamental research work, said residual acceleration is still too high to allow a perfect analysis of the investigated phenomena. In case of manned space travel projects, tests were run with levitating liquid drops or the like. However, such drops are exposed to the unwanted influences of the spacecraft and of the observing man thus not allowing to bring about the condition of complete zero gravity.

There has been known a compensation system for a satellite (U.S. Pat. No. 3,785,595) comprising a levitating body within the satellite, the position of the body relative to the satellite housing being determined by a sensing device. Subject to the position of the body inside the satellite, the sensing device controls thrusters correcting the position of the satellite in that the body always remains in a specific desired position relative to the satellite. Thence the compensation system serves for adapting the total satellite to the position of the levitating body so that the position of the satellite in the orbit is foreseeable and the satellite can be used for the purposes of navigation for geophysical functions.

It is the object of the invention to provide an apparatus allowing to eliminate nearly completely the residual acceleration of a body within a manned spacecraft while complying with the safety conditions for the crew.

It is another object of the invention to provide a system in which the body is not exposed to any residual acceleration due to gravitation, while the room to move for the body inside the spacecraft is limited.

Another object of the invention is to provide a system by which the scanning units monitoring the position of the body relative to a protection box moving together with the body, control driving means which are not provided directly at the protection box but at components of the spacecraft.

The apparatus of the invention for the acceleration-free mounting of a body in a spacecraft is characterized in that an evacuatable protection box contactfree enclosing from all sides the body is provided which contains contactless scanning units to monitor the position of the body inside the protection box, that the protection box is guided along three axes by a guide system firmly connected to the spacecraft and that the movements along each of the three axes are accomplished by driving means controllable by the scanning units so that the protection box follows changed positions of the body relative to the spacecraft.

The body or experimental pack is enclosed by the protection box and shielded against outer influences. The protection box is linked to the spacecraft in a mechanically movable form. The control of its movement is performed by contactfree control of the relative movements of the body with respect to the outer protection box. Due to a regulating system the protection box follows the movements of the body to keep on enclosing it like a shield. The triaxial guide and drive system enables the protection box to follow the body in all required directions and to adapt to each position of the body. The body hovers inside the protection box without contacting its walls.

Preferably, the scanning unit for each of the three axial directions consists of at least one light barrier pair whose beams run transversely to the axial direction at both sides of the center position of the body through the protection box. By this means, it is possible with a movement of the body inside the protection box to determine in which direction the readjusting of the protection box is required so as to return the body into the desired position inside the protection box. The body itself is levitating inside the protection box and exempt from any influence of outer forces.

The relative movement between the spacecraft and the protection box can be used as a control factor for the correction of the flight path of the spacecraft. By this means, test times can be optionally extended because by the own driving correction of the spacecraft, the protection box is prevented from abutting against a limitation of its guide system.

For continuous or temporary observation purposes, it is possible to mount independently and free from the body recording instruments, e.g. a movie camera, a photographic camera or a television camera at the protection box. Thus, unwanted influences on the body by continuous movements e.g. film transport in the movie camera, or occasional movements, e.g. film transport in the photographic camera, are avoided. The resetting operation may be performed by optical marks at the body. Alternatively, it is also possible to draft the marks in the optical field of the recording instrument and to eliminate optically, later, the relative movement in the photo interpretation.

By means of the apparatus of the invention, the residual acceleration acting on the body can be confined to an extremely low value. The still existing residual acceleration can be directly analysed by recording the control factors of the protection box and measuring the simultaneous acceleration at the protection box.

With reference to the sole FIGURE in the drawing, an embodiment of the invention will be explained more closely hereinafter.

The drawing shows a view of the apparatus, partly as a cross sectional view.

For fundamental research work in different branches, spacecraft offer new possibilities of experimental work with reduced gravity. The acceleration in spacecraft is between $10^{-4}$ to $10^{-6}$ $g_{erd}$, $g_{erd}$ meaning the acceleration due to gravity of 981 cm s$^{-2}$. The residual acceleration having a very great influence on test runs, after all, the illustrated apparatus is mounted in the spacraft.

The apparatus of the invention comprises a protection box 10 enclosed at all sides and sealed hermetically by a cover 11. In the protection box 10, there is a body 12 which can be looked upon as an experimental module and contains the systems required to perform measurements under zero gravity. Body 12 is levitating completely free of contact inside the protection box 10, i.e. it does not contact the wall of the protection box. If the position of body 12 changes, the position of the protection box 10 inside the spacecraft is also changed by a readjusting system, so that the position of body 12 relative to the protection box 10 remains always the same.

The protection box 10 is guided to be displaceable in length at two guide rails 13 of which only one is illustrated in the drawing. To this effect, an attachment 14 with guide rolls 15 engaging both sides of the straight-lined rail 13 is provided thus ensuring an exact linear guidance along axis z.

The ends of rails 13 extending in parallel to the axis z are interconnected by cross rods 16 and further connected with one other rail 17 (illustrated only once). Rail 17 extends in vertical direction and is displaceable vertically, i.e. along axis y. Rail 17 passes between three guide rolls 18 supported pivotably at a holder 19.

Further guide rolls 20, supported at the holder 19, roll off at a third guide rail 21 extending in longitudinal direction of the spacecraft and being firmly connected to the spacecraft via a mounting 22. Their direction of travel is characterized by the axis x.

One of the rolls 15,18 or 20 each is drivable by a (non-illustrated) motor. Said drive roll engages without a slip corresponding rail 13,17 or 21 resp. To determine the position of the body 12 inside the protection box 10, there are provided scanning units in the form of light barriers. To scan the position in z-direction, light barriers 23 and 24 are mounted. They contain each a light source secured to the cover 11 and one light receiver assembled at the bottom of the protection box. If body 12 is situated exactly in the center of the protection box 10, it does not interrupt the beams of the light barriers 23 and 24. However, if it escapes in z-direction from the center position, the beam of one of the light barriers 23 or 24 is interrupted. In the same manner, light barriers 25,26 comprising a light source arranged at the wall of the protection box 10 and a light receiver mounted at the opposite wall are arranged to determine a displacement of the body 10 in y-direction from the center position.

Another (non-illustrated) pair of light barriers serves for determining displacements of the body 12 from its center position in x-direction. The beams of the mentioned light barriers are emitted at a right angle to those of the light barriers 23 and 24 and at a right angle to the beams of the light barriers 25,26.

The driving motors of the driven rolls 15,18 and 20 are controlled by the signals of the three light barriers in that, with a displacement of the body 12 in x-direction, the protection box 10 is conducted in x-direction so that body 12 again takes its center position inside the protection box 10. The follow-up movements in y-direction and in z-direction are realised in the same way.

The preparation of the experiment is performed at a residual acceleration $10^{-4}$ to $10^{-6}$ $g_{erd}$ in the spacecraft. Body 12 is centered mechanically or magnetically in the center position relative to the protection box 10; during the preparatory time, it can be connected to the energy supply of the spacecraft via an umbilical cord. If an experiment is made in body 12 with a material melt, the test material is preheated in the preparatory phase to below the melting point of the material. At the end of the preparatory time, the main axes of the spacecraft are aligned in direction of the residual acceleration vector, the umbilical cord is separated thus switching over to the autonomous internal supply and recording of the body or experimental module 12. The protection box 10 is closed and evacuated. Upon releasing the locking for the directions of movement along the three axes x,y and z and upon releasing the centering of body 12, the three contactfree scanning units (light barriers) assume the control of the protection box for the three axes. The protection box is migrating inside the spacecraft. At the end of the test period, which is defined by the residual acceleration of the outer system and by the length of the spacecraft, the body 12 is captured inside the protection box 10.

Axes x,y,z are are selected regardless of the axis orientation in the space-shuttle/spacelab established internationally.

What is claimed is:

1. Apparatus for acceleration-free mounting of a body in a spacecraft comprising an evacuatable protection box adapted for enclosing therein without contact a relatively free floating body, means for monitoring the position of said body relative to x, y and z axes and to said protection box without physically contacting the body, means for supportingly guiding said protection box for movement along x, y and z axes corresponding to said body axes, and means responsive to outputs of said monitoring means indicative of movement of said body along its x, y and z axes corresponding to said monitoring means indiciative of movement of said body along its x, y and z axes for correspondingly moving said protection box along its corresponding x, y and z axes to compensate for body movement and thereby maintain the body out of contact with said protection box.

2. The apparatus as defined in claim 1 wherein said monitoring means includes a pair of beam generator means for generating a pair of spaced beams for each of said x, y and z body axes with said body normally being positioned between each pair of spaced beams.

3. The apparatus as defined in claim 1 wherein said supportingly driving means includes at least one drive roller corresponding to each one of said x, y and z protection box axes, and said drive rollers being selectively driven from the outputs of said monitoring means to selectively move said protection box along its x, y and z axes.

4. The apparatus as defined in claim 2 wherein said supportingly driving means includes at least one drive roller corresponding to each one of said x, y and z protection box axes, and said drive rollers being selectively driven from the outputs of said monitoring means to selectively move said protection box along its x, y and z axes.

5. The apparatus as defined in claim 4 wherein said supportingly guiding means includes a rail disposed along a respective x, y and z axis, and each said at least one drive roller being in driving contact with an associated x, y and z axis rail.

6. The apparatus as defined in claim 1 wherein said guiding means include at least three rails with at least one rail of said at least three rails being disposed in coincidence with an associated one of said x, y and z axes.

7. The apparatus as defined in claim 1 where said guiding means include at least three rails with at least one rail of said at least three rails being disposed in coincidence with an associated one of said x, y and z axes, said supportingly driving means includes at least one drive roller corresponding to each one of said x, y and z protection box axes and the rail associated therewith, and said drive rollers being selectively driven from the outputs of said monitoring means to selectively move said protection box along the rails corresponding to its x, y and z axes.

8. The apparatus as defined in claim 7 including means mounting one of said drive rollers to said protection box.

9. The apparatus as defined in claim 7 wherein said at least three rails are normal to each other.

* * * * *